US006096090A

United States Patent [19]

Guglielmi et al.

[11] Patent Number: 6,096,090

[45] Date of Patent: Aug. 1, 2000

[54] METHOD OF DESIGNING AN ELECTRICAL FILTER AND FILTER THUS OBTAINED

[75] Inventors: Marco Guglielmi, Wassenaar, Netherlands; Graham Connor, Arlesey, United Kingdom

[73] Assignee: Agence Spatiale Europeenne, Paris, France

[21] Appl. No.: 09/027,141

[22] Filed: Feb. 20, 1998

[30] Foreign Application Priority Data

Feb. 20, 1997 [FR] France .................................. 97 02018

[51] Int. Cl.[7] .................................................... G06F 17/50

[52] U.S. Cl. .................................... 716/1; 703/2; 703/13; 333/212; 333/202

[58] Field of Search ......................... 395/500.02, 500.25, 395/500.23, 500.34, 500.35; 333/212, 202

[56] References Cited

U.S. PATENT DOCUMENTS

| | | | |
|---|---|---|---|
| 4,360,793 | 11/1982 | Rhodes et al. | 333/212 |
| 5,432,723 | 7/1995 | Chen et al. | 708/300 |
| 5,760,667 | 6/1998 | Young et al. | 333/212 |

FOREIGN PATENT DOCUMENTS

| | | |
|---|---|---|
| 2690769 | 5/1993 | France . |

OTHER PUBLICATIONS

Vleck, M.; Unbehauen, R.; “Analytical Solutions for Design of IIR Equiripple Filters”, IEEE Transactions on Acoustics, Speech and Signal Processing; vol. 37, Issue 10, pp. 1518–1531, Oct. 1989.

Guglielmi, M.; “Simple CAD Procedures for Microwave Filters and Multiplexers”; IEEE Transactions on Microwave Theory and Techniques; vol. 42, Issue 7, Part. 1–2, pp. 1347–1352, Jul. 1994.

Macchiarella, G.; “An Origianl Approach to the Design of Bandpass Cavity Filters with multiple Couplings”, IEEE Transactions on Microwave Theory and Techniques, vol. 45, No. 2, pp. 179–187, Feb. 1997.

Udomchokpaiboon et al., “CAD Technique for Designing Microwave Transistor Active Filters”, Electronics Letters, vol. 27, Issue 19, pp. 1694–1696, Sep. 1991.

Guglielmi, M., “Accurate CAD of Integrated Band–Pass and Second Harmonic Band–Reject Microwave Filters”, IEEE MTT–s International Microwave Symposium Digest 1998, vol. 2, pp. 813–816, Jun. 1998.

Cameron, R. J., “Gereneral Coupling Matrix Sythesis Method for Chebychev Filtering Functions”, IEEE Transactions on Microwave Theory and Techniques, vol. 47, Issue 4, pp. 433–442, Apr. 1999.

M. Guglielmi et al. “Novel Design Procedure for Microwave Filters” 23$^{rd}$ European Microwave Conference, Sep. 6–9, 1993, Madrid, pp. 212–213, XPOO2045137*le document en enier*.

Guglielmi M. “Simple CAD Procedure for Microwave Filters and Multiplexers” IEEE Transactions on Microwave Theory and Techniques vol. 42, No. 7, Part 02, 1 Juillet 1994, pp. 1347–1352, XPOO0457502 *p. 1350, colonne de droite, ligne 9–p. 1351, colonne de gauche, ligne 5*.

*Primary Examiner*—Kevin J. Teska
*Assistant Examiner*—Douglas W. Sergent
*Attorney, Agent, or Firm*—Fulbright & Jaworski, LLP

[57] ABSTRACT

There is disclosed a method for designing an electrical filter comprising the steps of: a) selecting at least one determined function called seed function; b) determining the product of all these seed functions to define a transfer function generating function of the electrical filter; c) translating the electrical filter transfer function into transmission zeroes and poles; d) and synthesizing those electrical filter dimensions that achieve the required zeroes and poles. A particular application is aimed at a Chebycheff filter comprised of serially arranged resonant cavities and couplers, operating in the microwave range.

5 Claims, 4 Drawing Sheets

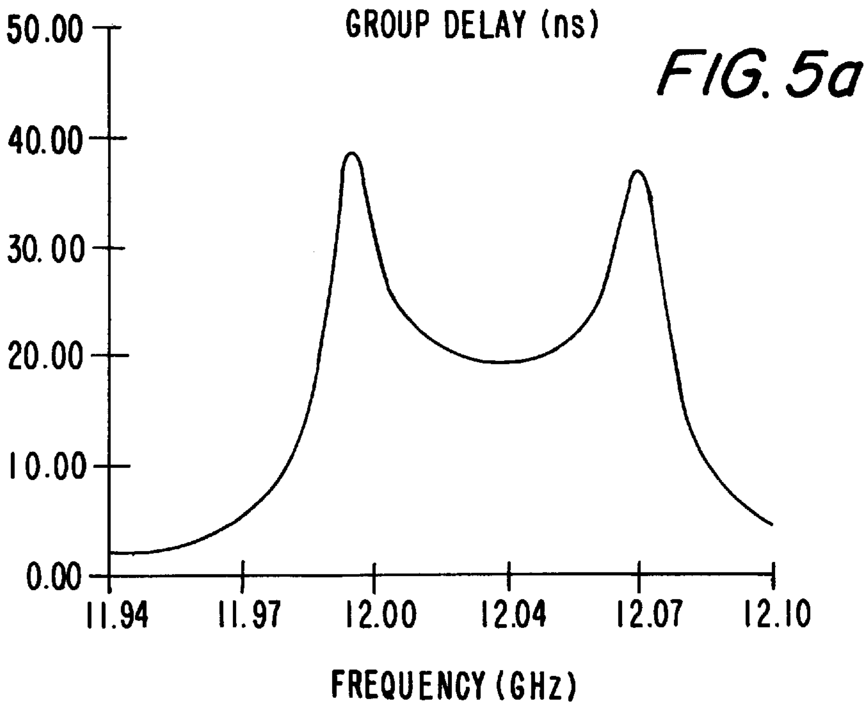
FIG. 5a
FIG. 5b
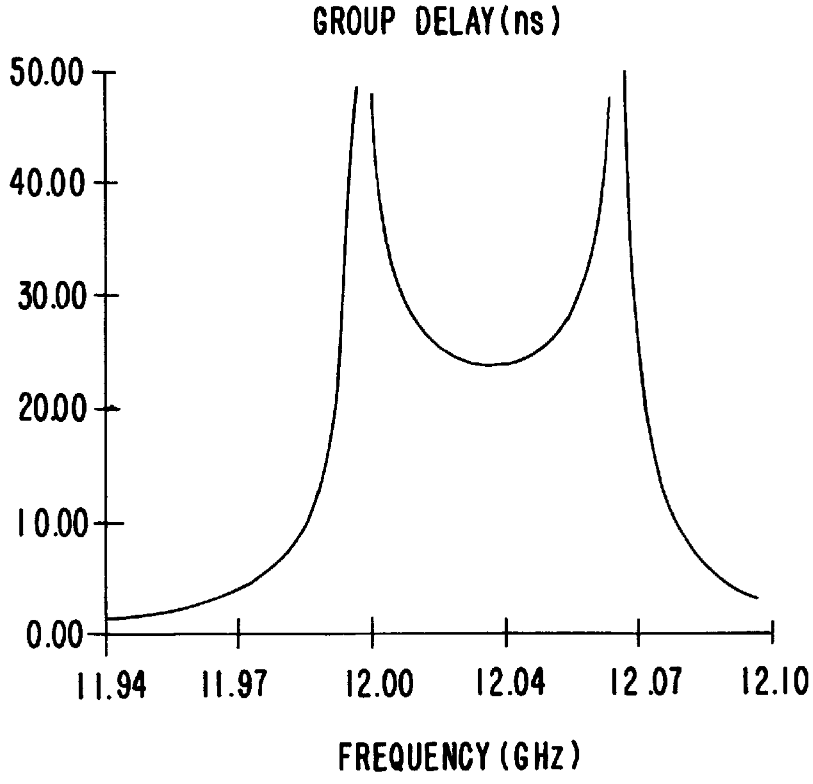

METHOD OF DESIGNING AN ELECTRICAL FILTER AND FILTER THUS OBTAINED

FIELD OF THE INVENTION

The present invention is directed to a method for designing an electrical filter and, in particular, to developing a filter for microwave range applications.

The invention further relates to a filter obtained according to this method.

BACKGROUND ART

Recent industrial demand in the area of microwave filters clearly indicates a need both for higher frequencies of operation and reduced manufacturing cost and time. In support of these needs, there is an on-going very substantial research and development effort aimed at producing faster and more versatile CAD (computed-aided design) packages for microwave filter design.

As a result of this activity, it is now possible, in some cases, to manufacture electrical filters in "one single run" going directly from conception to manufacture without breadboard or post-manufacture tuning. Although the use of advanced CAD packages is a clear benefit, there is still the problem that in order to obtain good results in one single run, the hardware must be manufactured with high accuracy. It is a well-known fact, in the field of interest, that the higher the manufacturing accuracy the higher are the manufacturing time and cost of the hardware and thus some of the desired benefit is lost.

More specifically, currently available electrical filters, for both ground and space applications mainly belong to the Chebycheff family, (with or without transmission zeroes). The filters operating in the microwave range of common interest are usually ones having waveguide type structure. Recent work on this type of electrical filter has shown that a critical factor in the achievement of a "one single run" result, without the need for post-manufacture tuning, is the relative separation in frequency of the return loss zeroes. These findings are disclosed by Marco Guglielmi and Graham Connor in a paper entitled "Industrial Implementation of Tuning-Less Microwave Filters", published in "Microwave Engineering Europe", December, January 1996, pp. 39–40. The filters discussed in this document are based on thick inductive windows implemented in a rectangular waveguide.

In standard Chebycheff filters, the return loss zeroes are equispaced within the filter band-pass thus providing an equiripple response. However, if one of the resonators the filter is comprised of or if one of the couplings of the filter does not have the required dimensions due to a manufacturing error, the electrical performance of the filter is adversely affected.

Another family of filter which is known is the Butterworth family. In this type of filters, all of the return loss zeroes are located in the center of the band-pass. The result is that this type of filter is less sensitive than a Chebycheff filter to manufacturing errors but still, it exhibits a continuously curved response throughout the band-pass. This feature makes Butterworth filters not suitable for many practical applications.

SUMMARY OF THE INVENTION

It is therefore an object of the invention to provide a method for designing electrical filters which are free of the prior art drawbacks listed above.

By virtue of the method according to the invention, one can both construct filters in one single run, while retaining an equiripple response, and lower the sensitivity to manufacturing errors.

In accordance with the present method, this feature is achieved by controlling the position of return loss zeroes.

The invention is aimed at providing a method for designing an electrical filter the transfer function of which satisfies the following relationship $$(S_{21}(P))^2 = \frac{1}{1 + h^2 G_m^2(P)},$$

$G_m(P)$ being a polynomial function of degree n, called generating function, p being the complex frequency, and h being a predetermined scaling factor, comprising the steps of:

a) selecting at least one determined function called seed function;

b) determining the product of all said seed functions to define said electrical filter generating function $G_m(P)$ and transfer function;

c) translating said electrical filter transfer function into transmission zeroes and poles;

d) and determining those physical parameters of said electrical filter that achieves said zeroes and poles.

BRIEF DESCRIPTION OF THE DRAWINGS

The invention will become more apparent along with other features and advantages from the description which follows when taken together with the appended drawings, wherein

FIGS 5*a* and 5*b* represent the group delay curves of a sample electrical filter provided with the structure of FIGS. 3*a* and 3*b*, in relation to a filter according to the invention and a filter of the prior art, respectively;

DETAILED DESCRIPTION OF THE INVENTION

Figure 1:
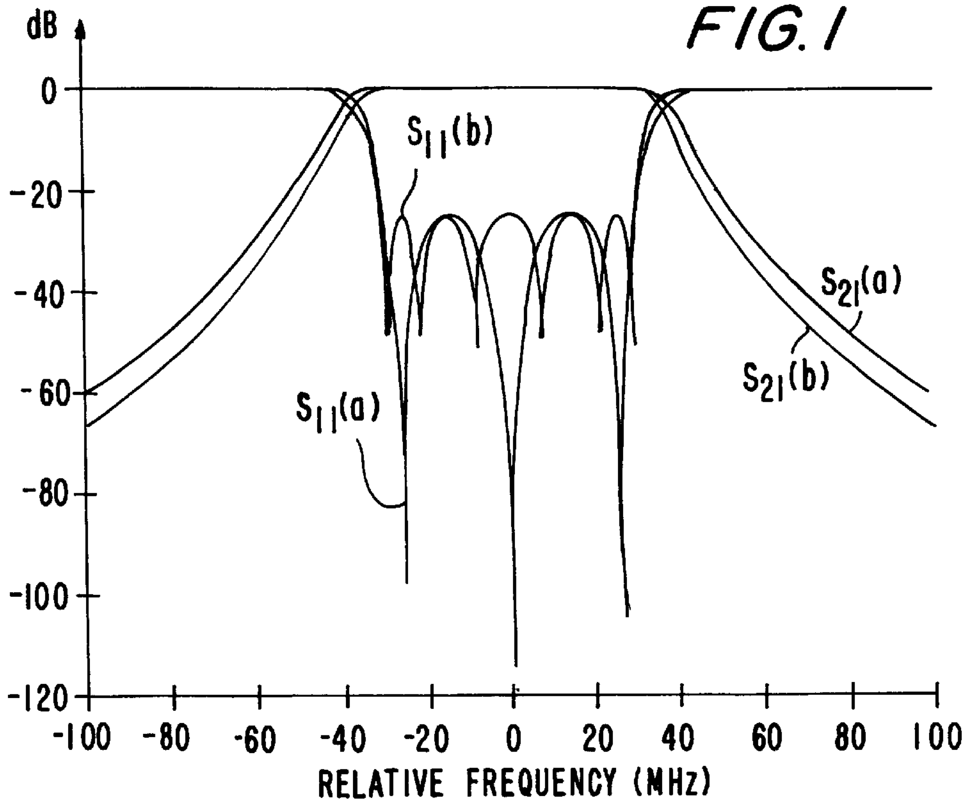
FIG. 1 represents the transmission curves of a sample prior art electrical filter and of a corresponding electrical filter according to the invention.

Modelling rational functions representing an ideal filter is well known and has been extensively studied previously. Several methods have been suggested. Reference is made, merely by way of example, to the book of J. D. Rhodes: *Theory of Electrical Filters,* John Wiley & Sons, 1967, (see, in particular, chapters 2.6 and 4.7).

The method disclosed involves synthesizing filters having a so-called scaled network configuration, i.e. serially arranged and coupled filters. While the synthesis is aimed at getting a given amplitude response, prerequisites such as a maximally flat response, or a maximum number of inversion points, are known to lead to "Chebycheff filter" or "Butterworth filter" functions, respectively. Such functions, which are mathematical representations of the ideal filter, can adopt any rational form provided that the input impedance is a positive real function. Namely, the following relationships may be considered:

$$Re\ Z(P)>0 \text{ for } Re\ P>0 \quad Im\ Z(P)=0 \text{ for } Im\ P=0 \tag{1),}$$

which allow the filter to be synthesized as interconnected passive components. In the above equation, Re and Im are the real and imaginay parts, respectively, and $p=\sigma+i\omega$ is the complex frequency.

A more common representation of the transfer function is given by the form:

$$S_{21}(P)=\frac{N(P)}{D(P)}, \tag{2}$$

wherein the denominator must satisfy the following condition:

$$D(P)\neq 0 \text{ for Re } P>0 \tag{3),}$$

(ensuring a locally stable transfer (function) and any zoeroes of N(p) must be either purely imaginary or occur in symetric pairs.

Alternatively, the filter transfer function can further be represented in the form:

$$S_{21}(P)^2=\frac{1}{1+h^2G_m^2(P)}, \tag{4}$$

wherein ($G_m$(P), called the generating function, is a polynomial of degree n and the scaling factor h allows the control of the transfer function within the band-pass of the filter.

According to one important feature of the invention, a given generating function resulting from the product of elementary functions, called "seed functions", is chosen. The generating function $G_m$(P) according to the invention fits the following equation:

$$G_m(P)=\prod_{i=1}^{k}C_{n_i}(P), \tag{5}$$

and where the total filter order now becomes $$m=\sum_{i=1}^{k}n_i, \tag{6}$$

i.e. equal to the sum of the degrees of the seed functions, constituting the generating functions. These functions will be referred to hereinafter as "Chained functions".

For instance, consider the seed function C(P) as being a so-called Generalized type Chebycheff function. We may define this as:

$$C_{n_i}(P)=\cos\left(\sum_{i=1}^{n_1}\cos^{-1}p+\frac{\frac{1}{p_1}}{i\left(1-\frac{p}{p_i}\right)}\right), \tag{7}$$

wherein the letters $P_1$ stand for the transmission zeroes of the filter. This relation may be transformed, using known techniques, into a rational function form to give:

$$C_{n_1}(P)=\frac{N_{n_1}(P)}{D_{l_1}(P)}, \tag{8}$$

$$N_{n_1}(P)=\overset{n_1}{\underset{l=1}{C}}(P-Z_l), \tag{9}$$

$$D_{l_1}(P)=\prod_{0=l}^{l_1}(P-P_0), \tag{10}$$

Taking m such functions, we can define the overall filtering function by evaluating the product of the individual seed functions. Realisability is ensured by the fact that each function in the product is realisable. The band-pass is normalized to ±i so that the modulus of each function will have unity value at the band edges.

Having derived the chained functions from a generating function, it remains only to derive the global transfer function in the rational form from (8), (5) and (4), namely $$S_{21}(P)^i=\frac{D_1^{2m}(P)}{D_1^{2m}+h^2N_n^{2m}(P)}, \tag{11}$$

We than select only the left half-plane poles of the transfer function, and reconstruct to a realisable form for synthesizing the filter. The poles occur in the usual alternating left/right half-plane configuration, and we may equate the polynomial form of the transfer function with the even and odd admittance form, respectively, from the Barlett's Bisection Theorem:

$$S_{21}(P)=\frac{Y_e-Y_0}{(1+Y_e)(1+Y_0)}, \tag{12}$$

where $Y_e$ and $Y_0$ are the even and odd input admittances, respectively.

The transfer value, or ABCD matrix of the filter is then defined as $$\frac{1}{Y_e-Y_0}\begin{bmatrix} Y_e+Y_0 & 2 \\ 2Y_eY_0 & Y_eY_0 \end{bmatrix}, \tag{13}$$

From this point, we can proceed ahead with the synthesis of the filter through known art techniques, for example by using the methods disclosed in the aforementioned book of J. D. Rhodes, i.e. standard synthesis based on the usual ladder or folded array synthesis procedure.

The method according to the invention makes it possible to design an electrical filter which, as demonstrated hereinafter, displays lower sensitivity to manufacturing errors. Briefly stated, the method comprises the following steps of:

1) selecting one or more determined "seed" function(s);
2) determining the product of these selected seed functions to establish a novel filter transfer function or more specifically, a novel generating function, from which, using equation (4), one can determine the transfer function;

3) translating the filter transfer function into transmission zeroes and poles;

4) synthesizing the filter appropriate physical dimensions, i.e. its physical parameters, that achieve the required zeroes and poles.

For purposes of illustration, and not by way of limitation, we shall describe an example of filter according to the invention having a chained function, and quasi Chebycheff characteristics (i.e. the "seed" functions thereof are Generalized Chebycheff functions). It is evident, however, that any other seed function may be used, provided that it is realisable.

As a first example, we may chain m standard first order Chebycheff functions, $C_1(P)=P/i$ and find that the resulting function is simply the Butterworh generating function, with all of the return loss zeroes at p=0.

Next we take a higher order Chebycheff function, and chain it with itself to form a squared Chebycheff function, we get as a result the following relationship:

$$G_m(P)=C_m^{\ m}P \qquad (14),$$

having n zeroes of multiplicity m (i.e. a total of mxn zeroes). Since both functions are Chebycheff, the resulting function retains the Chebycheff function characteristics, i.e. an equiripple behaviour between p=i and p=−i, allowing exact prescription of the return loss level and band-pass.

For example, FIG. 1 shows typical curves, respectively, of a 3$^{rd}$ order standard Chebycheff function filter and of a filter, according to the invention, of the same base order, having a squared generating function.

On FIG. 1, there are shown 2 series of curves representing typical transfer coefficients as applied to transmission and return loss: $S_{21}$ (a) and $S_{11}$ (a), for the filter of the invention, and $S_{21}$ (b) and $S_{11}$ (b), for a standard filter of the prior art. The ordinate axis values are given in dB, the maximum transmission being 0 dB in the band-pass (no loss), and the abscissa axis values correspond to relative frequencies in MHz.

The order of the filter according to the invention is now equal to six (2×3). From this figure, it can be seen that the filter of the invention (a) is slightly less selective in comparison to a standard Chebycheff filter (b).

Figure 2:
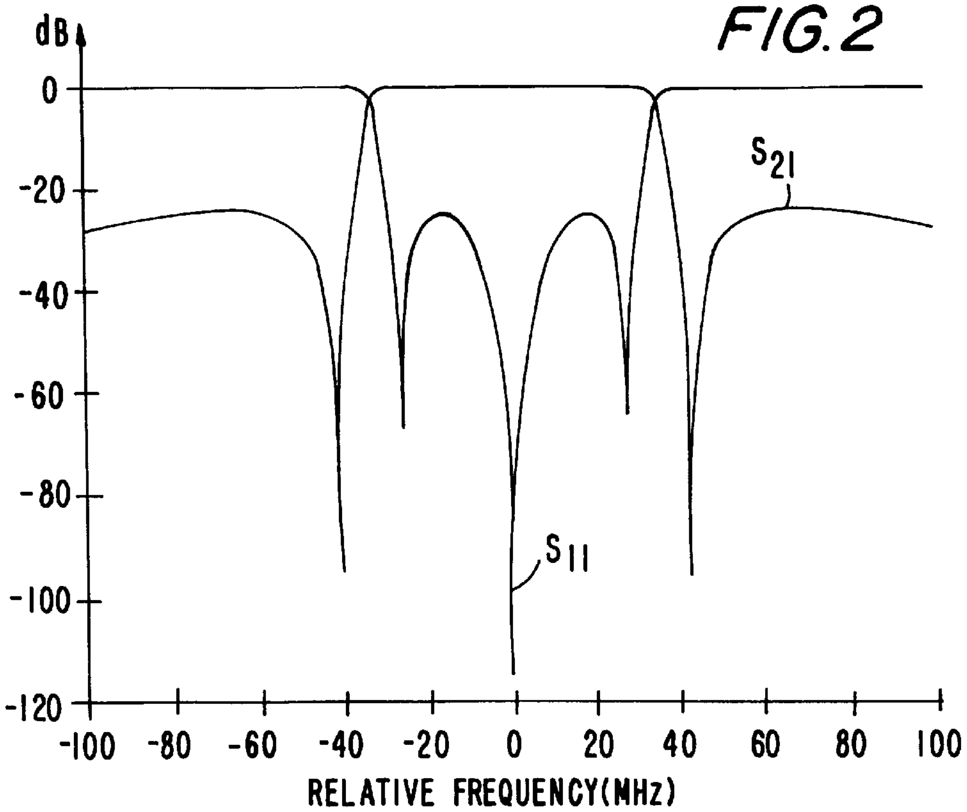
FIG. 2 represents the transmission curves of a second sample electrical filter according to the invention.

If the seed function is a Generalized Chebycheff function with a pair of transmission zeroes, for instance, the resulting chained function will also have transmission zeroes, as shown in FIG. 2, which represents a third order filter according to the invention the generating function of which has been squared. This filter has transmission zeroes of the second order at ±1,4i in the complex frequency plane (FIG. 2).

To evaluate the tolerance to manufacturing errors of the microwave filters, made according to the method of the invention, a sample narrow-band filter, comparable to the ones regularly used for output multiplexers, was chosen, for illustration and not by way of limitation. The filter chosen is a 6-pole filter with a useful bandwidth from 12.006 to 12.06 MHz. Two filters have been designed by adopting a similar approach to the procedure disclosed by Marco Guglieimi in "Simple CAD Procedure for Microwave Filters and Multiplexers", a paper published in "IEEE TRANSATIONS ON MICROWAVE THEORY AND TECHNIQUES", vol. 42, N° 7, July 1994, pp. 1347–1352. This procedure is a CAD-based technique. The filters are comprised of serially arranged elementary cells or resonant cavities, such cells being interconnected by coupling elements. It may be viewed as an iterative procedure, whereby "propagation" occurs from cell to cell, resulting finally in the determination of the transmission and return loss coefficient of the whole filter.

Figure 3B:
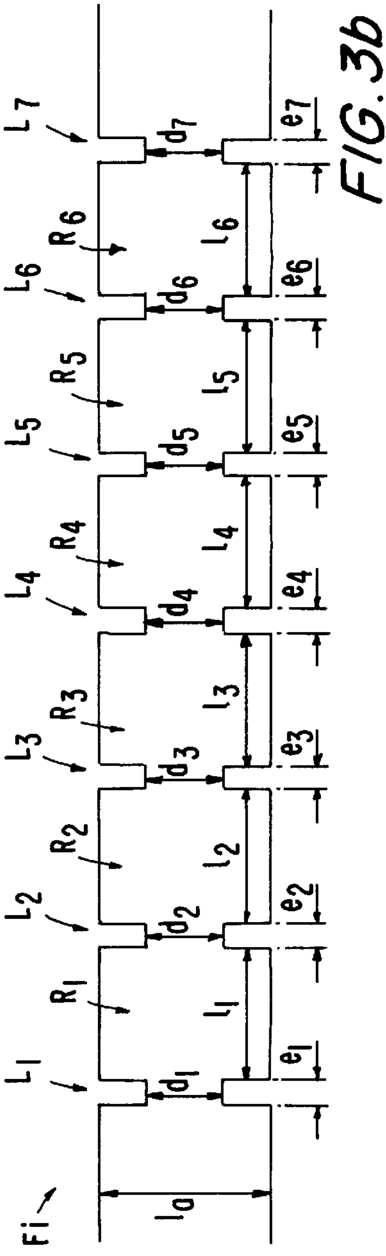
FIGS. 3*a* and 3*b* schematically represent a sample electrical filter structure comprising resonant cavities and inductive couplers.
Figure 3A:
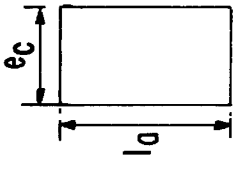

A side and a top view of the physical configuration of the filters examined herein are respectively outlined at FIGS. 3*a* and 3*b*. The first filter is a standard Chebycheff filter of the second order and the second one is a filter developed according to the invention the seed function of which has been cubed. A filter of order six is thus obtained, as previously shown.

The two filters make use of serially connected resonant cavities, $R_1$ to $R_5$, each comprised of a rectangular waveguide. These two filters are identical in structure, differing only in dimensions of their constituent elements, to achieve the required transmission zeroes and poles following the 4$^{th}$ step of the method in accordance with the invention. Each resonant cavity, $R_1$ to $R_6$, is coupled to the next one by thick window inductive steps, $L_1$ to $L_7$, which further provide coupling of the resonant cavities to the input ($L_1$) and the output ($L_7$) of the filter Fi.

The table apprended hereto lists the respective dimensions of the different elements of the two filters, in millimeters, as specified in FIGS. 3*a* and 3*b,* the cavities' thickness and breadth, $e_c$ and $I_a$, respectively, the cavities' lengths, $I_1$ to $I_6$, the coupling elements' thickness, $e_1$ to $e_7$, and the windows' breadth, $d_1$ to $d_7$.

Figure 4B:
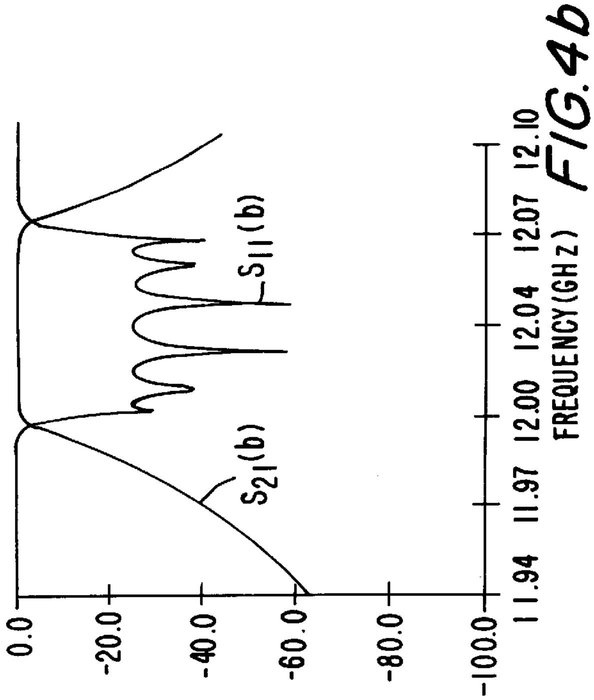
FIGS. 4*a* and 4*b* represent transmission curves of a sample electrical filter provided with the structure of FIGS. 3*a* and 3*b*, in relation to a filter according the invention, and a filter of the prior art, respectively.
Figure 4A:
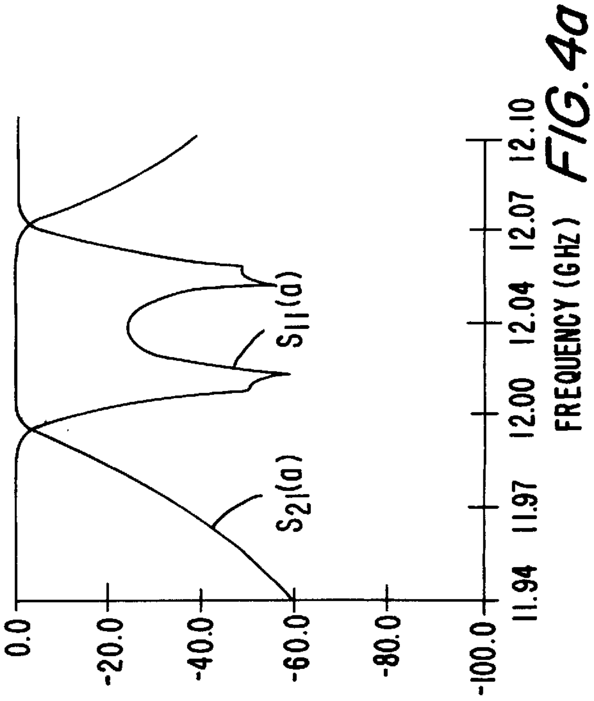

FIGS. 4*a* and 4*b* represent the simulation results of the 2 filters, both that persuant to the invention (FIG. 4*a*) and the standard filter (FIG. 4*b*). As previously, the coefficient variation curves, $S_{11}$ and $S_{12}$, for both filters are given. Likewise, the ordinate axis values are expressed in dB while the abscissa axis values correspond no longer to relative frequencies but to absolute frequencies, in GHz.

These curves clearly show a perfect band-pass match for both filters, but the filter according to the invention (FIG. 4*a*), as mentioned previously, exhibits a slightly diminished out-of-band attenuation in case of the filter according to the invention (FIG. 4*a*), the transmission poles are clustered, as expected, around two frequencies. The frequencies have the same locations as the poles of a second order Chebycheff filter.

Additional features, namely the curves representing the group delay associated with these two filters, can be compared by looking at FIGS. 5*a* and 5*b,* which correspond to a filter according to the invention and to a standard Chebycheff filter, respectively. The ordinate axis values represent the group delay, in nanoseconds, and the abscissa axis values correspond to the absolute frequencies, in GHz. It is readily demonstrated that the filter according to the invention introduces less group delay variation than a standard Chebycheff filter.

Figure 6C:
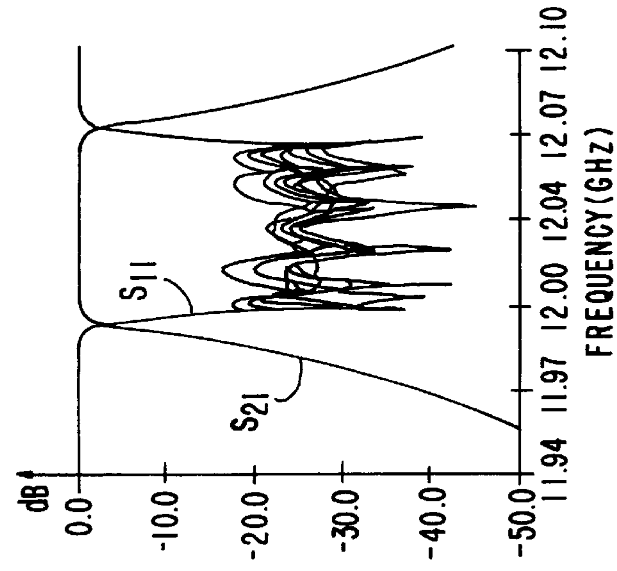
FIGS. 6*a* 6*b* and 6*c* represent cumulative transmission curves in relation to filters provided with the structure of FIGS. 3*a* and 3*b* and from which comparison of the relative manufacturing errors sensitivities of filters according to the invention and of the prior art, respectively can be made.
Figure 6B:
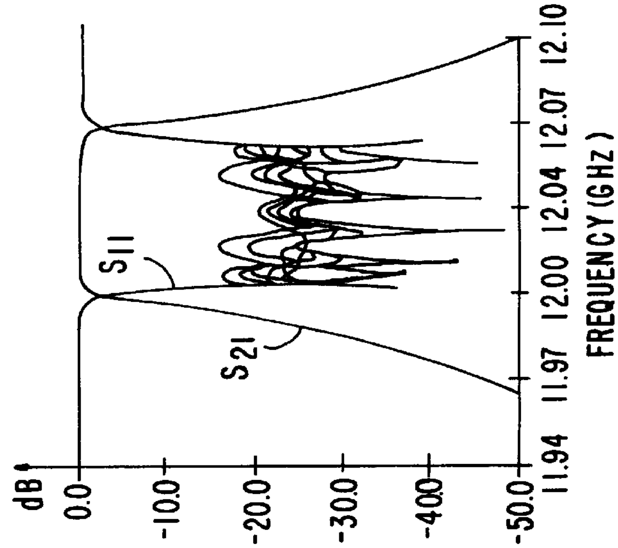
Figure 6A:
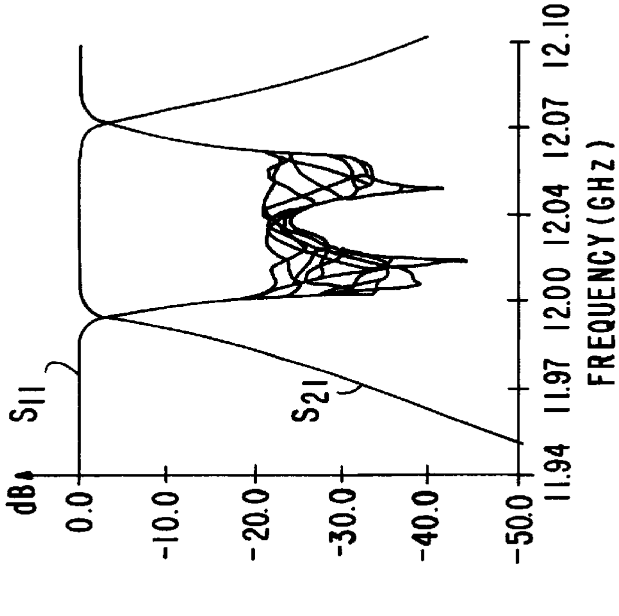

For evaluating the effects of manufacturing tolerance, we introduced errors in the ideal dimensions of the filters as will be apparent from the table appended hereto. More specifically, a great number of errors has been introduced according to a Gaussian random distribution function. A distribution variance equal to 1.5 μm was chosen and resulted in a maximal error of 4 μm. The results of seven experiments have been combined in FIGS. 6*a* and 6*b,* relating, respectively, to the filter according to the invention and to a typical Chebycheff filter. The different sets of curves are similar to curves, $S_{11}$ and $S_{21}$, of FIGS. 4*a* and 4*b*. By comparing these results, it was found that the filter according to the invention (FIG. 6*a*) is substantially more robust than a standard Chebycheff filter.

This convenient feature can be accounted for by the fact that the filter, designed according to the invention, is less critical since its transmission poles are more spaced apart. Such a feature can further be explained by the fact that, for a given band-pass, a filter persuant to the invention is slightly less selective than a standard Chebycheff filter, as already noted.

An additional experiment was conducted by designing a standard Chebycheff filter the band-pass of which has been slightly increased whereby an out-of-band attenuation identical to that of a given filter according to the invention like the one shown on FIG. 4*a* was obtained. Seven experiments were performed as previously described. This is illustrated by FIG. 7. It can be seen that the robust behaviour of the classical Chebycheff filter is enhanced (i.e. manufacturing error sensitivity is reduced), while staying inferior to that of the filter according to the invention as demonstrated by comparing FIGS. 5*a* and 7.

From the foregoing, it will be readily seen that the invention achieves the required results.

The filters realized according to the invention are less sensitive to manufacturing errors than currently known filters, while retaining similar if not identical electrical characteristics. Besides, they display less group delay variation.

Regarding Chebycheff filters in particular, the filters according to the invention retain all advantages of the former, namely a flat response curve and an equiripple behaviour, their out-of-band attenuation performances being furthermore kept comparable to those of typical Chebycheff filters having similar features.

It should be apparent, however, that the invention is not solely limited to the embodiment examples specifically disclosed, especially in regards to the sample filter structure shown at FIGS. 3*a* and 3*b*. Indeed, the filters persuant to the invention can be designed by employing, as shown by the figures, a rectangular waveguide comprised of magnetically coupled resonant cavities, or even still, by using other currently available technologies, depending on the desired wave range.

Finally, it should be appreciated that, while being particularly adapted to manufacturing filters related to the Chebycheff filter family, the invention is not to be considered as confined to this particular application. The invention can be equally applied to the design of other filter types: Butterworth filters, elliptic filters, etc.

APPENDEX

| Dimensions (in mm) | Prior art (Chebycheff) | Invention (chained) |
|---|---|---|
| $e_c$ | 9.525 | 9.525 |
| $I_a$ | 19.05 | 19.05 |
| $e_1$ | 1.059 | 0.646 |
| $e_2$ | 1.028 | 0.768 |
| $e_3$ | 1.371 | 1.232 |
| $e_4$ | 1.423 | 1.299 |
| $e_5$ | 1.371 | 1.232 |
| $e_6$ | 1.028 | 0.768 |
| $e_7$ | 1.059 | 0.646 |
| $d_1$ | 6.425 | 6.425 |
| $d_2$ | 2.950 | 2.950 |
| $d_3$ | 2.950 | 2.950 |

-continued

APPENDEX

| Dimensions (in mm) | Prior art (Chebycheff) | Invention (chained) |
|---|---|---|
| $d_4$ | 2.950 | 2.950 |
| $d_5$ | 2.950 | 2.950 |
| $d_6$ | 2.950 | 2.950 |
| $d_7$ | 6.425 | 6.425 |
| $I_1$ | 15.379 | 15.421 |
| $I_2$ | 16.154 | 16.157 |
| $I_3$ | 16.158 | 16.159 |
| $I_4$ | 16.158 | 16.159 |
| $I_5$ | 16.154 | 16.157 |
| $I_6$ | 15.379 | 15.421 |

What is claimed is:

1. A method for designing an electrical filter for filtering microwaves, the transfer function of which satisfies the following relationship:

$$(S_{21}(P))^2 = \frac{1}{1 + h^2 G_m^2(P)}$$

$G_m(P)$ being a polynomial function of degree n, called an electrical filter generating function, wherein p is the complex frequency, and h is a predetermined scaling factor, comprising the steps of:

a) selecting at least one determined function called a seed function wherein said seed function is a generalized Chebycheff function satisfying the following relationship:

$$C_{ni}(P) = \cos\left[\sum_{i=1}^{ni} \cos^{-1} \frac{p + \frac{1}{p_1}}{i\left(1 - \frac{p}{p_1}\right)}\right]$$

wherein P1 stands for said filtering transmission zeroes;

b) determining according to a multiplying step the product of all said seed functions to define said electrical filter generating function $G_m(P)$ and said transfer function;

c) translating said electric filter transfer function into transmission zeroes and poles; and d) determining those physical parameters of said electrical filter that achieve said zeroes and poles and utilizing said physical parameters for construction of said electrical filter for filtering microwaves, such that construction is made possible in one single run.

2. The method according to claim 1, wherein said selection step involves selecting a so-called unique seed function $C_{ni}(P)$ and said multiplying step involves self multiplying said seed function, such that the relationship $$G_m(P) = \sum_{i=1}^{k} C_{nl}(P)$$

is satisfied, where k stands for a positive integer and $G_m(P)$ stands for said electrical filter generating function.

3. A method according to claim 1, wherein said designing of said electrical filter is implemented by utilization of a rectangular waveguide comprised of serially arranged resonant cavities ($R_1$–$R_6$) interconnected by an inductive window based couplers ($L_1$–$L_7$), whereby said step of physical parameter determination involves a determination of the dimensions of said resonant cavities ($R_1$–$R_6$) and the dimensions of said window based couplers ($L_1$–$L_7$), that achieve said poles and zeroes.

4. An electrical filter product, as produced through execution of the process according to claim 1.

5. The electrical filter product according to claim 4, wherein said production involves the use of a transfer function which is a Chebycheff function delimiting a bandpass in the microwave range.

* * * * *

UNITED STATES PATENT AND TRADEMARK OFFICE

CERTIFICATE OF CORRECTION

PATENT NO. : 6,096,090
DATED : August 1, 2000
INVENTOR(S) : Guglielmi et al.

It is certified that error appears in the above-identified patent and that said Letters Patent is hereby corrected as shown below:

Title page,
Item [75] Inventors, change "Arlesey" to -- Beds --.

Column 2,
Lines 10-15, change "$(S_{21}(P))^2$" to -- $S_{21}(P)^2$ --.

Column 3,
Line 12, change "Re Z(P)>0 for Re P>0 Im Z(P) = 0 for P=0 (1),"
to -- Re Z(P)>0 for Re P>0
(1),
Im Z(P) = 0 for P=0 --.
Line 31, delete parenthesis before the word "function".
Line 41, delete parenthesis berore the word "$G_m(\dot{P})$".

Column 4,
Lines 31-33, change "$(P)^i$" to -- $(P)^2$ --.

Column 5,
Line 25, change "$c^{m}$" to -- $c^m$ --
Line 64, change "Guglieimi" to -- Gugielmi --.

Column 6,
Line 17, change "$R_5$" to -- $R_6$ --.

Column 7,
Line 17, change "7" to -- 6c --.
Line 21, change "7" to -- 6c --.

UNITED STATES PATENT AND TRADEMARK OFFICE

CERTIFICATE OF CORRECTION

PATENT NO. : 6,096,090
DATED : August 1, 2000
INVENTOR(S) : Guglielmi et al.

It is certified that error appears in the above-identified patent and that said Letters Patent is hereby corrected as shown below:

Column 8,
Lines 21-24, change "$(S_{21}(P))^2$" to -- $S_{21}(P)^2$ --.

Signed and Sealed this

Twenty-eighth Day of May, 2002

*Attest:*

JAMES E. ROGAN

*Attesting Officer*

*Director of the United States Patent and Trademark Office*